United States Patent
Brennan et al.

(10) Patent No.: US 10,117,022 B1
(45) Date of Patent: *Oct. 30, 2018

(54) PORTABLE AUXILIARY UNIT FOR VOICE ACTIVATED MEDIA PLAYER

(71) Applicant: Ninety7, Inc., Wheaton, IL (US)

(72) Inventors: Kevin Brennan, Wheaton, IL (US); Mike Prstojevich, Wheaton, IL (US)

(73) Assignee: Ninety7, Inc., Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,388

(22) Filed: Jun. 28, 2018

Related U.S. Application Data

(63) Continuation of application No. 15/711,834, filed on Sep. 21, 2017, now Pat. No. 10,021,486.

(51) Int. Cl.
*H04R 5/02* (2006.01)
*H04R 1/02* (2006.01)
*H01M 2/10* (2006.01)

(52) U.S. Cl.
CPC ............ *H04R 5/02* (2013.01); *H01M 2/1022* (2013.01); *H04R 1/02* (2013.01); *H04R 2205/021* (2013.01)

(58) Field of Classification Search
CPC ...... H04R 5/02; H04R 1/02; H04R 2205/021; H01M 2/1022
USPC .................................................. 381/332, 334
See application file for complete search history.

(56) References Cited

U.S. PATENT DOCUMENTS

| | | |
|---|---|---|
| 7,869,195 B1 | 1/2011 | Patton |
| 8,195,114 B2 | 6/2012 | Krampf et al. |
| 8,369,558 B2 | 2/2013 | Conrad et al. |
| 8,913,776 B2 | 12/2014 | Maezawa et al. |
| 2008/0037813 A1 | 2/2008 | Entner |
| 2008/0226096 A1 | 9/2008 | Waddell et al. |
| 2008/0273734 A1 | 11/2008 | Solland |
| 2014/0321686 A1 | 10/2014 | Wegener |
| 2017/0187206 A1 | 6/2017 | Lafountain et al. |
| 2017/0215004 A1 | 7/2017 | Wengreen |

OTHER PUBLICATIONS

MOKCAO Power + Cordless Speaker, (MOKCAO Power + Cordless Speaker with Battery Base for Amazon Echo Dot $2^{nd}$ Generation—Aug. 19, 2017—https://www.amazon.com/gp/product/B074FHLC2F/ref=ask_ql_qh_dp_hza?th=1#customerReviews).

*Primary Examiner* — David Ton
(74) *Attorney, Agent, or Firm* — Neal, Gerber & Eisenberg LLP

(57) ABSTRACT

A portable auxiliary unit for coupling with a mobile audio player is disclosed. The auxiliary unit provides both auxiliary power input and auxiliary audio output for the player, as well as a protective casing in the form of a receiving cup open on a top side. The receiving cup provides access to inputs and outputs on the audio player accessible by cabling from the auxiliary unit installed when an access panel is opened. The auxiliary unit has an integral rechargeable battery pack and a speaker assembly connectable to the audio player via the cables.

20 Claims, 7 Drawing Sheets

PORTABLE AUXILIARY UNIT FOR VOICE ACTIVATED MEDIA PLAYER

CROSS REFERENCE

This application is a continuation of U.S. patent application Ser. No. 15/711,834, filed on Sep. 21, 2017, the contents of which are fully incorporated herein by reference.

TECHNICAL FIELD

The present invention relates generally auxiliary or rechargable power supplies, and more specifically, to rechargeable power supplies for mobile audio devices.

BACKGROUND OF THE INVENTION

Mobile audio players are ubiquitous and can come in many forms. They may come in the form of, for example, a cell phone, an MP3 player, or even headphones. While these players may have various other uses, mobile audio players, as described herein, all have the ability to output an audio signal. Some simply provide an audio output jack, while others have a speaker. Most have an internal rechargeable power source such as a lithium ion battery. However, both the power source and the speaker (if included) are typically of limited utility. For example, the sound quality from a standard smart phone would not be acceptable to entertain a large room of people or a backyard party, and the audio player power would wear down broadcasting at full volume for long.

Auxiliary power packs and rechargeable power supplies exist that couple with mobile audio players to increase their playback/operation time. But this does not solve the issue of sound quality. To achieve good sound quality and longer playback from a mobile audio player in an environment where line power is not convenient or not available (e.g., a backyard, a park, a beach, etc.), one needs both a rechargeable power supply and an auxiliary speaker assembly for amplified and improved sound.

SUMMARY OF THE INVENTION

The present invention constitutes a unique design that provides the utility of rechargeable power as well as enhanced audio output for a mobile audio device. The design further provides protection for the audio device through encapsulation in a housing. In some embodiments, the invention teaches a portable auxiliary unit for coupling with a mobile audio player, the auxiliary unit comprising a rechargeable battery pack, a speaker assembly, an audio connection cable for connecting the speaker assembly to an audio plug, a power connection cable for connecting the rechargeable battery to a power plug, and a receiving cup positioned over the rechargeable battery pack and speaker assembly. The receiving cup may comprise a seat for a non-integral mobile audio player, and a wall extending upward to at least partially encapsulate the mobile audio player when the audio player is nestled in the receiving cup. The wall may have an access port through which the audio plug and the power plug can extend. The plugs can be accessed through an access panel having a closed position and an open position. Other embodiments and features will be understood in connection with the below figures and description.

BRIEF DESCRIPTION OF THE DRAWINGS

The present invention can be better understood with reference to the following figures. The components in the figures are not necessarily to scale, emphasis instead being placed upon clearly illustrating the principles of the present invention. In the figures, like reference numerals designate corresponding parts throughout the several views.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
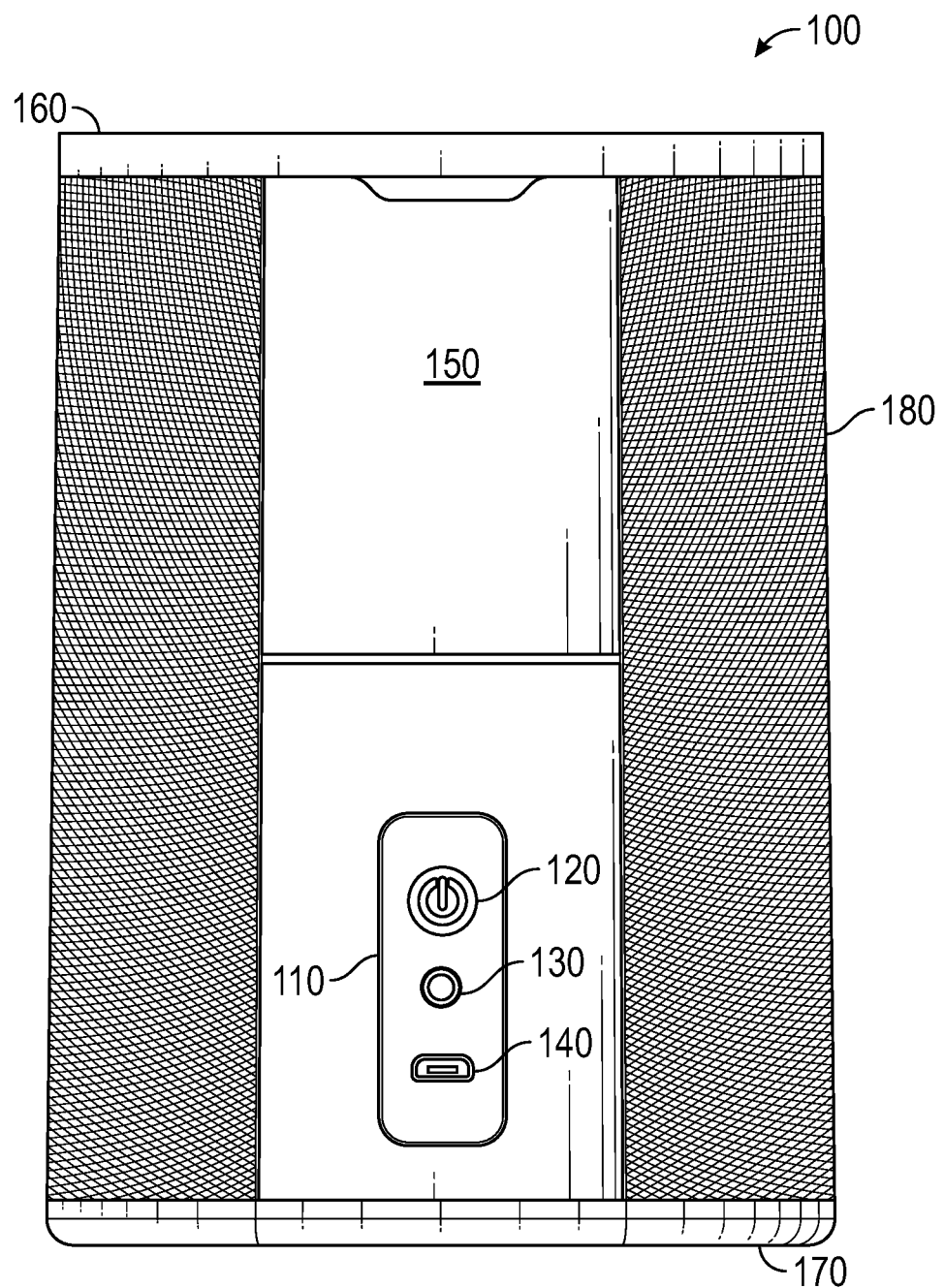
FIG. 1 is a front view of a portable auxiliary unit for a mobile audio player, where the unit's access panel is in a sealed configuration.

FIG. 1 illustrates a front view of an exemplary portable auxiliary unit 100, in accordance with a particular embodiment of the present invention. The portable auxiliary unit (which may also be called "auxiliary unit" or simply "unit" herein), may come in a variety of different sizes, shapes, and configurations to accommodate different forms of mobile audio player. As shown herein, the exemplary unit has been developed to support an Echo Dot™ device made by Amazon®. However, it will be understood from the figures and description how the auxiliary unit could be reconfigured (primarily by forming the receiving cup 160 in a different shape) to accommodate a variety of other types of mobile audio players.

Figure 2:
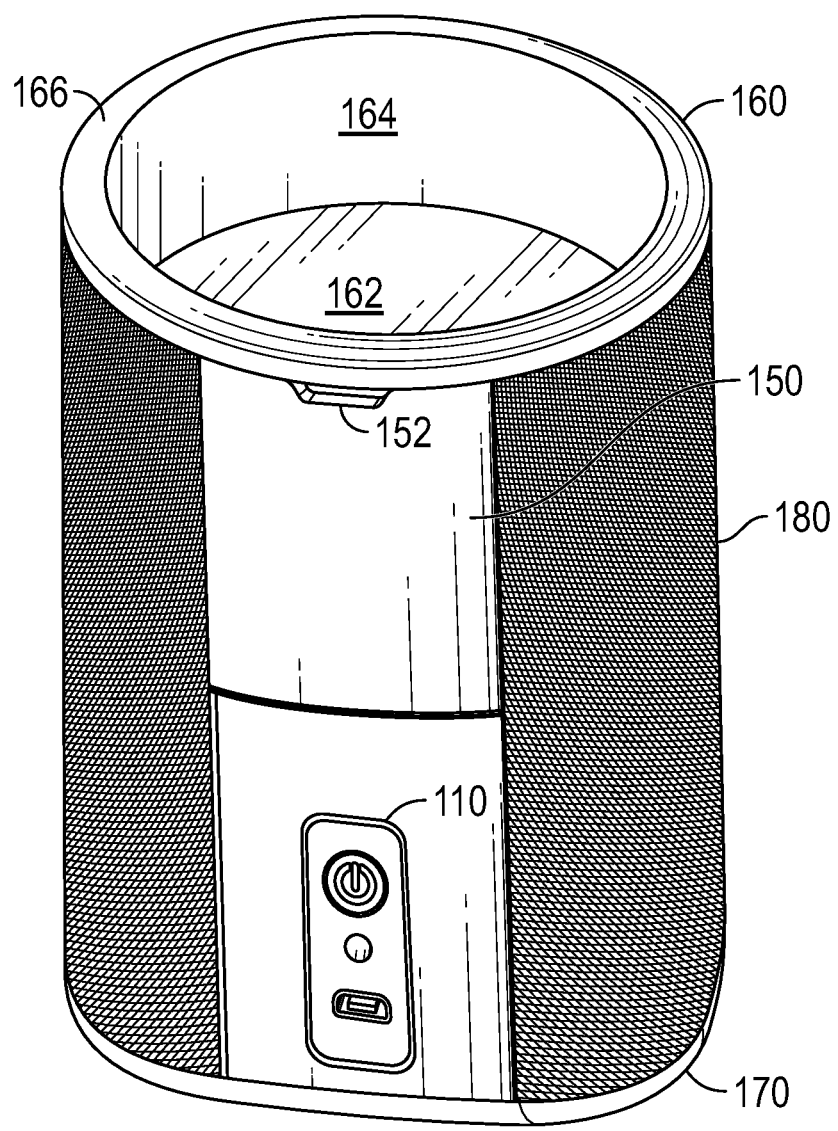
FIG. 2 is an elevated view of the portable auxiliary unit showing a housing for the mobile audio player.
Figure 3:
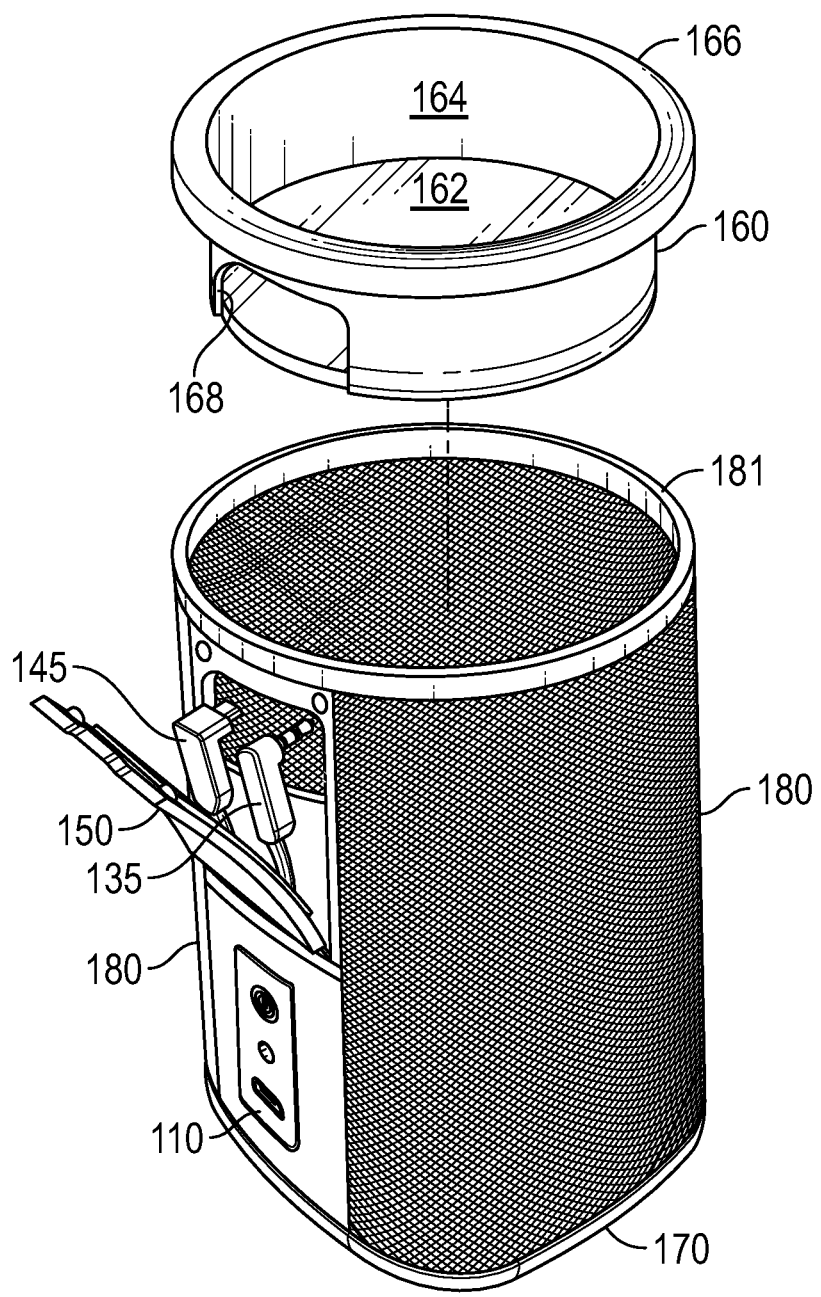
FIG. 3 is a partially exploded view of the portable auxiliary unit, showing the unit's access panel opened to reveal connection cables, and showing the housing cup in isolation.

As shown in FIG. 1, the exemplary auxiliary unit 100 rests on a base stand 170 at its bottom and has a receiving cup 160 at its top. As illustrated more clearly in FIG. 2, the receiving cup 160 is configured to receive a mobile audio player, in this case, audio player 200. Specifically, as illustrated, receiving cup 160 features a seat 162 on which the audio player 200 rests when installed, a cylindrical wall 164 that forms a perimeter round the outside of the audio player 200, and a lip 166 that extends outward from the top of the cylindrical wall 164. As illustrated in FIG. 3, the lip is used to support the receiving cup 160 at the top of the portable auxiliary unit 100 by resting on the upper portion of the outer casing 180. Thus, when audio player 200 is installed in the receiving cup 160, the cup encapsulates the audio player on all but its open top surface, and provides protection from impact, as well as some protection from moisture and dust. Additional protection may be provided by placing a lid over the receiving cup (not shown) to fully encapsulate the audio player 200.

The outer casing 180 extends from the lip 166 of the cup 160 down to the base stand 170, thereby forming an outer perimeter (side walls) of the auxiliary unit 100. At its top is a frame ring 180 to provide structure prior to assembly of the cup 160. The outer casing 180 may be made of various materials, but should allow for the clear passage of sound. In some embodiments, the casing may simply comprise a frame wrapped in a fabric or plastic mesh material. As shown on FIG. 1, the outer casing is interrupted at the front side of the unit 100 by an access panel 150 and a user interface 110. The user interface 110 features a power button 120 for powering on or off the auxiliary unit 100, a fixed audio input slot 130, and a fixed power input slot 140. The fixed audio input slot 130 is for receiving audio input from an external source other than audio player 200, such as, for example, a different type of mobile audio player. The fixed power input slot is to receive line power (stepped down via an adapter) for use in recharging the internal rechargeable battery pack 142.

The access panel 150 provides access to the controls of the audio player 200, specifically, audio player power input 205 and audio player audio output 210, when audio player 200 is installed in receiving cup 160. Access panel 150 is illustrated in a closed configuration in FIG. 1. The panel can be peeled back to an open configuration using tab 152 when audio player 200 is installed, or simply by pressing outward from the inside of the receiving cup 160 when the audio player 200 is absent. Receiving cup 160 features an access port 168 (best shown in FIG. 3) that aligns with the access panel 150 to facilitate opening the access panel 150 in the absence of audio player 200, but primarily to facilitate access to the audio player controls when audio player 200 is installed.

Figure 4:
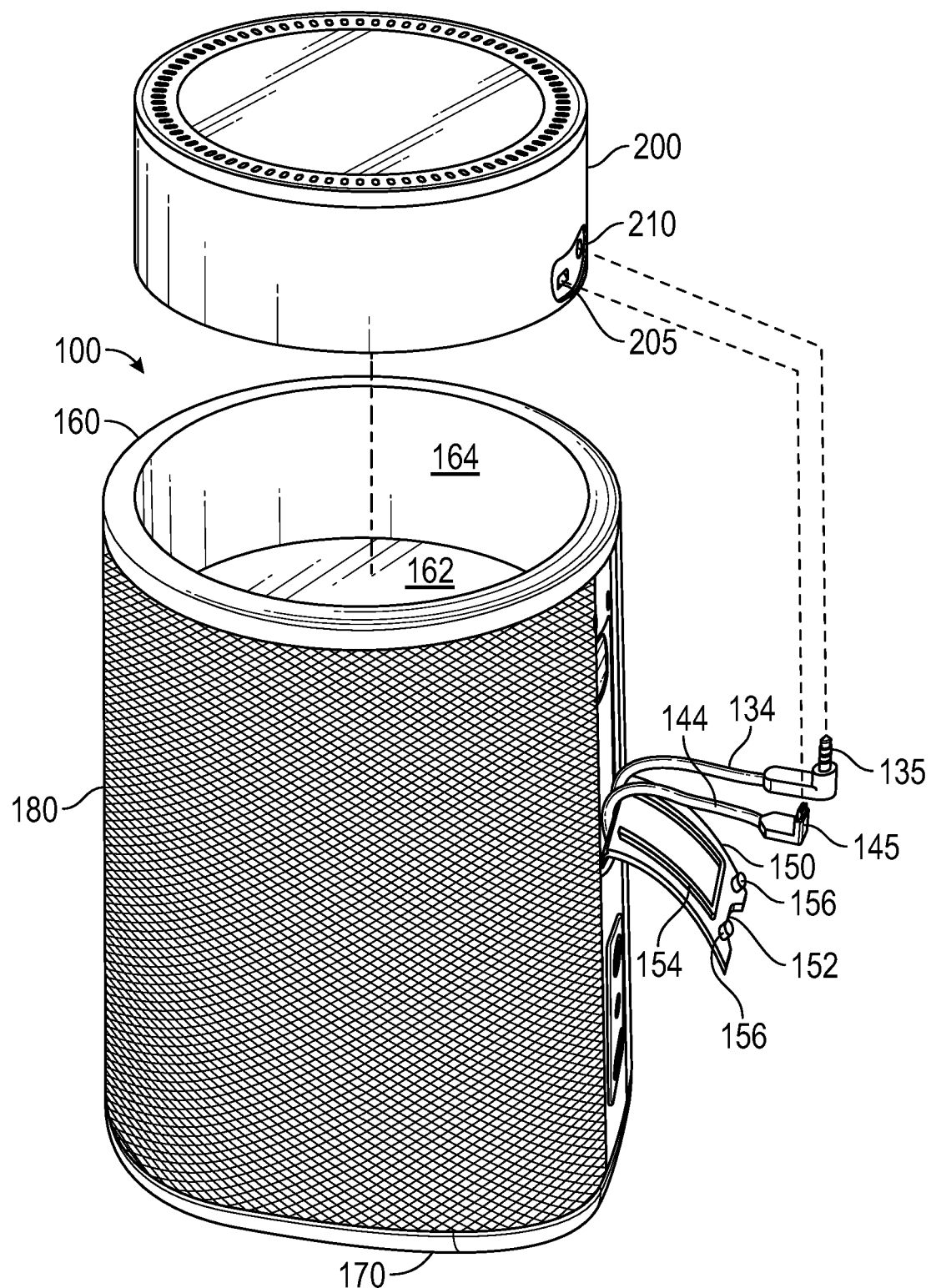
FIG. 4 is an elevated view of the portable auxiliary unit with the access panel open showing connection path to a mobile audio player.

Turning to FIG. 4, on its inside, access panel 150 features a seal extension 154 and two fastener plugs 156. The fastener plugs 156 correspond to receiving holes 181 formed in the outer casing 180 to secure the access panel 150 closed. The seal extension provides additional retention by seating up against a cutout 183 in the outer casing. At its lower end, the access panel 150 is jointed, and secured to the outer casing 180. The panel 150 may be rigid, such as plastic, or flexible, such as rubber.

Once the access panel is peeled back into an open configuration (FIG. 3), audio connection cable 134 and power connection cable 144 are revealed. These cables each feature plugs (audio plug 135 and power plug 145) that are configured to insert into audio player power input 205 and audio player audio output 210, respectively. The cables are each tethered permanently to the auxiliary unit 100, and extend down into an internal housing 182 where the power cable 144 connects to the rechargeable battery pack 142 and the audio cable 134 connects to a speaker assembly 132. The upper ends that feature the plugs are unfixed, and provide sufficient mobility to be manipulated into and out of the audio player 200 but have short enough cable lengths to secure within the outer casing 180 when access panel 150 is closed.

As shown, in operation, audio player 200 is positioned above receiving cup 160 so that its controls align with the access panel 150, and is lowered into the cup. Access panel 150 is peeled back and the plugs are inserted into the controls as indicated (audio plug 135 into audio output 210 and power plug 145 into power input 205). Then, access panel 150 is closed. At this point, provided the unit 100 is powered on and sufficiently charged, the audio player will receive auxiliary power from rechargeable battery pack 142 and will deliver audio signals through audio connection cable 135 to speaker assembly 132.

Figure 5:
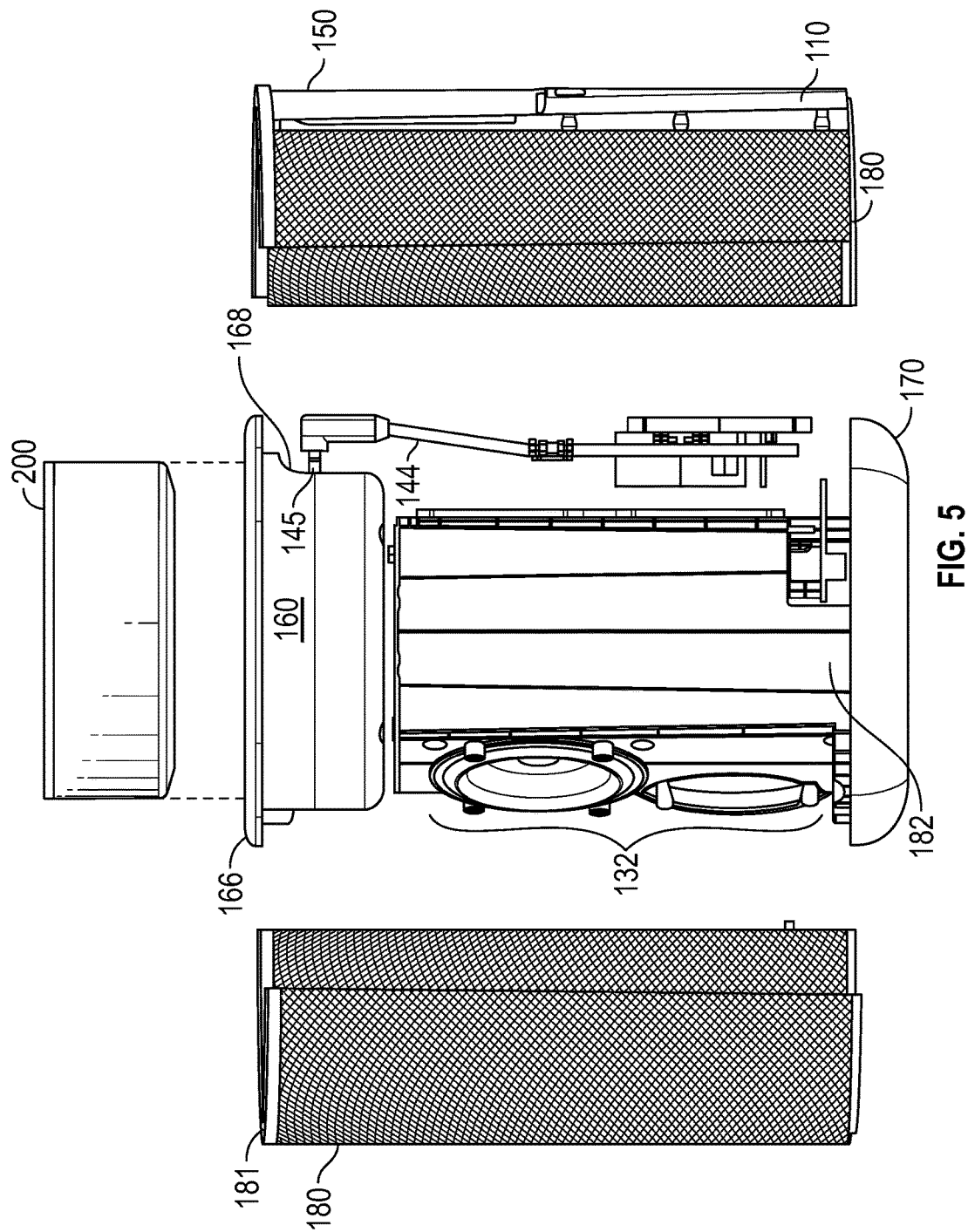
FIG. 5 is a partially exploded view of the portable auxiliary unit taken from a side view, illustrating various internal components.
Figure 6:
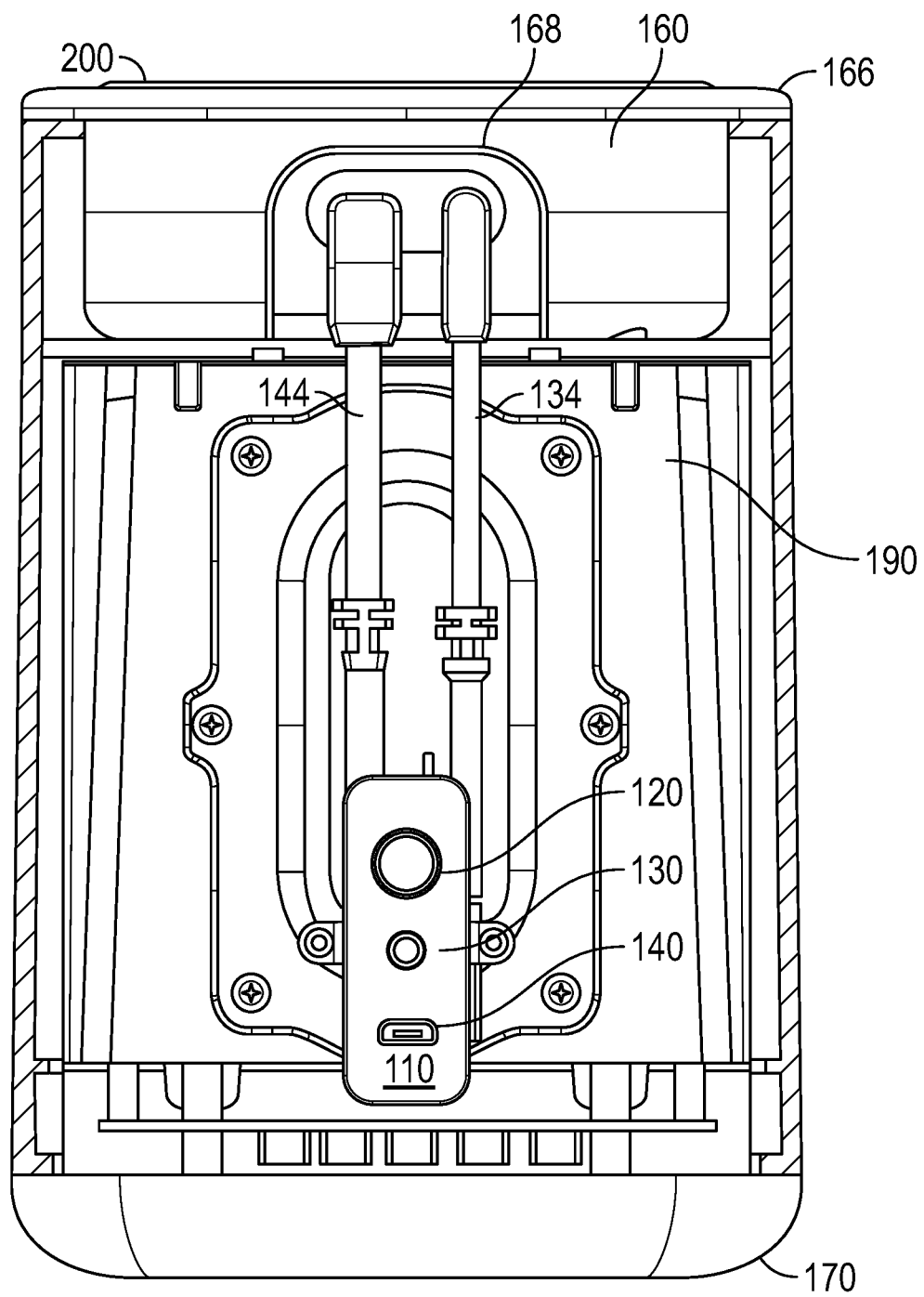
FIG. 6 is a partial section view of the portable auxiliary unit taken from the front side.
Figure 7:
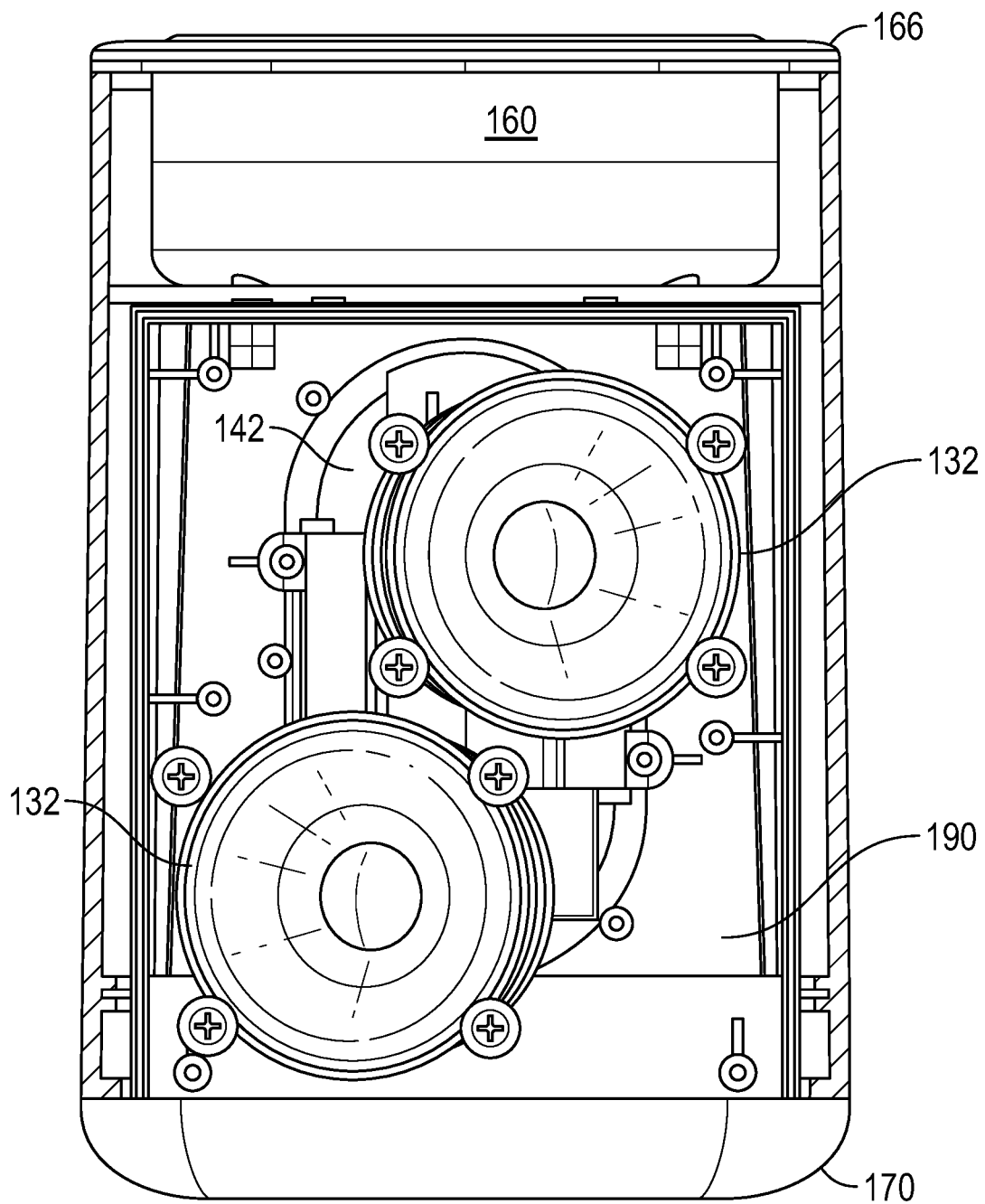
FIG. 7 is a partial section view of the portable auxiliary unit taken from the rear side.

FIGS. 5-7 illustrate internal components of exemplary auxiliary unit 100. Specifically, the outer casing 180 has been pulled away to reveal an internal housing 182 that provides a support framework for internal components such as speaker assembly 132 and rechargeable battery pack 142. FIG. 5 shows a left side view of the unit 100, with the front side and its user interface 110 on the right and the speaker assembly 132 on the left. FIG. 6 shows a front view, directly facing user interface 110. The controls and cables are physically separated from the speaker assembly 132 and the rechargeable battery pack 142 by divider 190, which forms the front wall of internal housing 182. However, the power features are electrically connected to the battery pack 142, and the audio features are electrically connected to the speaker assembly 132, through a whole in divider 190 near its base.

FIG. 7 shows a rear view of the internal components, again with the outer casing 180 removed. This is the opposite side of the divider 190 from FIG. 6. Here, the speaker assembly 132 can be seen mounted in conjunction with the rechargeable battery pack 142. In this embodiment, the speaker assembly includes two separate drivers, but may be more or less complicated or powerful in other configurations. The rechargeable battery pack can be configured with an internal adaptor, or even a switch to step power to different output levels for different devices, as set by the user. Speaker volume is dictated by output level of the audio player 200, but the auxiliary unit may have separate volume controls in some configurations.

Accordingly, it should now be clear how the present invention enhances the performance, volume, sound quality, and playback time of a common mobile audio player. The invention allows for longer playback for a larger group of people for stored or streamed audio where line power is not available or easily accessible. The unit is mobile and lightweight, yet provides sufficient protection for the audio player. The access panel and cabling also provide for ease of access/hookup and disassembly of the audio player to the auxiliary unit.

It should be emphasized that the above-described exemplary embodiments of the present invention, and particularly any "exemplary" embodiments, are possible examples of implementations, merely set forth for a clear understanding of the principles of the invention. Many other variations and modifications may be made to the above-described embodiments of the invention without substantially departing from the spirit and principles of the invention. All such modifications are intended to be included herein within the scope of this disclosure and the present invention and protected by the following claims.

The invention claimed is:

1. A portable auxiliary unit for coupling with a non-integral mobile audio player, the portable auxiliary unit comprising:
 a rechargeable battery pack;
 a speaker assembly;
 a connector assembly for operatively connecting at least one of the speaker assembly or the rechargeable battery pack to the non-integral mobile audio player, the connector assembly being movable relative to the rechargeable battery pack and the speaker assembly; and a cylindrical receiving cup positioned over the rechargeable battery pack and speaker assembly, the cylindrical receiving cup comprising:
- a substantially flat, circular seat for the non-integral mobile audio player,
- a wall extending upward from the circular seat and comprising at least one access port for receiving at least a portion of the connector assembly there through, and
- an open top formed by the wall, opposite the seat, for receiving the non-integrated mobile audio player.

2. The portable auxiliary unit of claim 1, wherein the connector assembly comprises at least one plug configured for coupling to at least one port of the non-integral mobile audio player.

3. The portable auxiliary unit of claim 2, wherein the at least one plug comprises a power plug configured for coupling to a power port of the non-integral mobile audio player.

4. The portable auxiliary unit of claim 3, wherein the connector assembly further comprises an audio plug configured for coupling to an audio port of the non-integral mobile audio player.

5. The portable auxiliary unit of claim 2, further comprising at least one connection cable for connecting the at least one plug of the connector assembly to at least one of the speaker assembly or the rechargeable battery pack.

6. The portable auxiliary unit of claim 5, wherein the at least one connection cable comprises a free end coupled to the at least one plug that is movable relative to a housing for encasing the speaker assembly and the rechargeable battery pack and a fixed end extending from and fixed to the housing.

7. The portable auxiliary unit of claim 5, wherein the at least one plug comprises a power plug, and the at least one connection cable comprises a power connection cable for connecting the power plug to the rechargeable battery pack.

8. The portable auxiliary unit of claim 7, wherein the connector assembly further comprises an audio plug and an audio connection cable for connecting the audio plug to the speaker assembly.

9. The portable auxiliary unit of claim 1, further comprising a housing positioned beneath the cylindrical receiving cup, the housing encompassing the rechargeable battery pack and the speaker assembly and supporting the cylindrical receiving cup.

10. The portable auxiliary unit of claim 9, further comprising at least one connection cable extending from the housing to operatively connect the connector assembly to at least one of the speaker assembly or the rechargeable battery pack.

11. The portable auxiliary unit of claim 1, wherein at least a portion of the connector assembly is configured for insertion into at least one port of a non-integral mobile audio player nestled within the cylindrical receiving cup upon aligning the at least one port of the mobile audio player with the at least one access port of the cylindrical receiving cup.

12. The portable auxiliary unit of claim 1, wherein the wall of the cylindrical receiving cup extends sufficiently upward so that an upper extremity of the wall is substantially flush with an upper surface of a non-integral mobile audio player nestled in the cylindrical receiving cup.

13. A method for coupling a portable auxiliary unit to a non-integral mobile audio player, the method comprising the steps of:
- placing the non-integral mobile audio player within a cylindrical receiving cup of the portable auxiliary unit such that at least one port of the portable auxiliary unit aligns with at least one access port of the cylindrical receiving cup, and the mobile audio player rests on a substantially flat, circular seat of the cylindrical receiving cup;
- extending at least one connector of the portable auxiliary unit through the at least one access port of the cylindrical receiving cup; and
- inserting the at least one connector into the at least one port of the non-integral mobile audio player,
- wherein the at least one connector is configured to operatively connect at least one of a rechargeable battery pack and a speaker assembly of the portable auxiliary unit to the non-integral mobile audio player.

14. The method of claim 13, wherein inserting at least a portion of the at least one connector into the at least one port of the non-integral mobile audio player comprises:
- inserting a first plug into a first port of the non-integral mobile audio player, the first plug thereby being operatively connected to the speaker assembly of the portable auxiliary unit.

15. The method of claim 14, wherein inserting at least a portion of the at least one connector into the at least one port of the non-integral mobile audio player further comprises:
- inserting a second plug into a second port of the non-integral mobile audio player, the second port thereby being operatively connected to the rechargeable battery pack of the portable auxiliary unit.

16. The method of claim 13, wherein the at least one connector is operatively connected to at least one of the speaker assembly or the rechargeable battery pack by at least one connection cable.

17. The method of claim 16, wherein the at least one connection cable includes a fixed end extending from a housing of the portable auxiliary unit and a free end coupled to the at least one connector and moveable with respect to the housing.

18. The method of claim 16, wherein the at least one connector comprises a power plug and the at least one connection cable comprises a power cable connected to the rechargeable battery pack of the portable auxiliary unit.

19. The method of claim 18, further comprising:
- extending an audio plug of the portable auxiliary unit through the at least one access port of the cylindrical receiving cup; and
- inserting the audio plug into an audio port of the non-integral mobile audio player, wherein the audio plug is operatively connected to the speaker assembly of the portable auxiliary unit by an audio connection cable.

20. The method of claim 13, wherein at least one connection cable extends from a housing of the portable auxiliary unit to operatively connect the at least one connector to at least one of the speaker assembly or the rechargeable battery pack.

* * * * *

UNITED STATES PATENT AND TRADEMARK OFFICE
CERTIFICATE OF CORRECTION

PATENT NO. : 10,117,022 B1
APPLICATION NO. : 16/022388
DATED : October 30, 2018
INVENTOR(S) : Kevin Brennan et al.

Page 1 of 1

It is certified that error appears in the above-identified patent and that said Letters Patent is hereby corrected as shown below:

In the Claims

Column 5, Line 14, "non-integrated" should be changed to --non-integral--.

Signed and Sealed this
Nineteenth Day of February, 2019

Andrei Iancu
*Director of the United States Patent and Trademark Office*